INVENTOR.
CORSTIAAN LE COMTE 3,348,223
AUTOMATIC COURSE PREDICTION NAVIGATIONAL DISPLAY
Corstiaan le Comte, Hilversum, Netherlands, assignor to North American Philips Company, Inc., New York, N.Y., a corporation of Delaware
Filed June 4, 1965, Ser. No. 461,411
Claims priority, application Netherlands, June 5, 1964, 64—6,358
7 Claims. (Cl. 343—5)

ABSTRACT OF THE DISCLOSURE

A navigational radar arrangement employing a deflection voltage simulation circuit for providing a deflection voltage representative of the actual time rate of change of an object detected by the radar echo pulse. The deflection circuit is provided with an automatically variable potentiometer for varying the time rate change of deflection voltage produced by position potentiometers over a range corresponding to the actual time rate change of the object under detection. A switch and integrator is coupled to the cathode ray display tube for translating the potentiometer voltage representing speed of the object to an extrapolation in the form of a visible trace of the predicted course movement. A function generator is connected to a position potentiometer to enable a course or speed correction to be proposed so that its predicted effect can be visualized prior to actual initiation.

---

Figure 1:
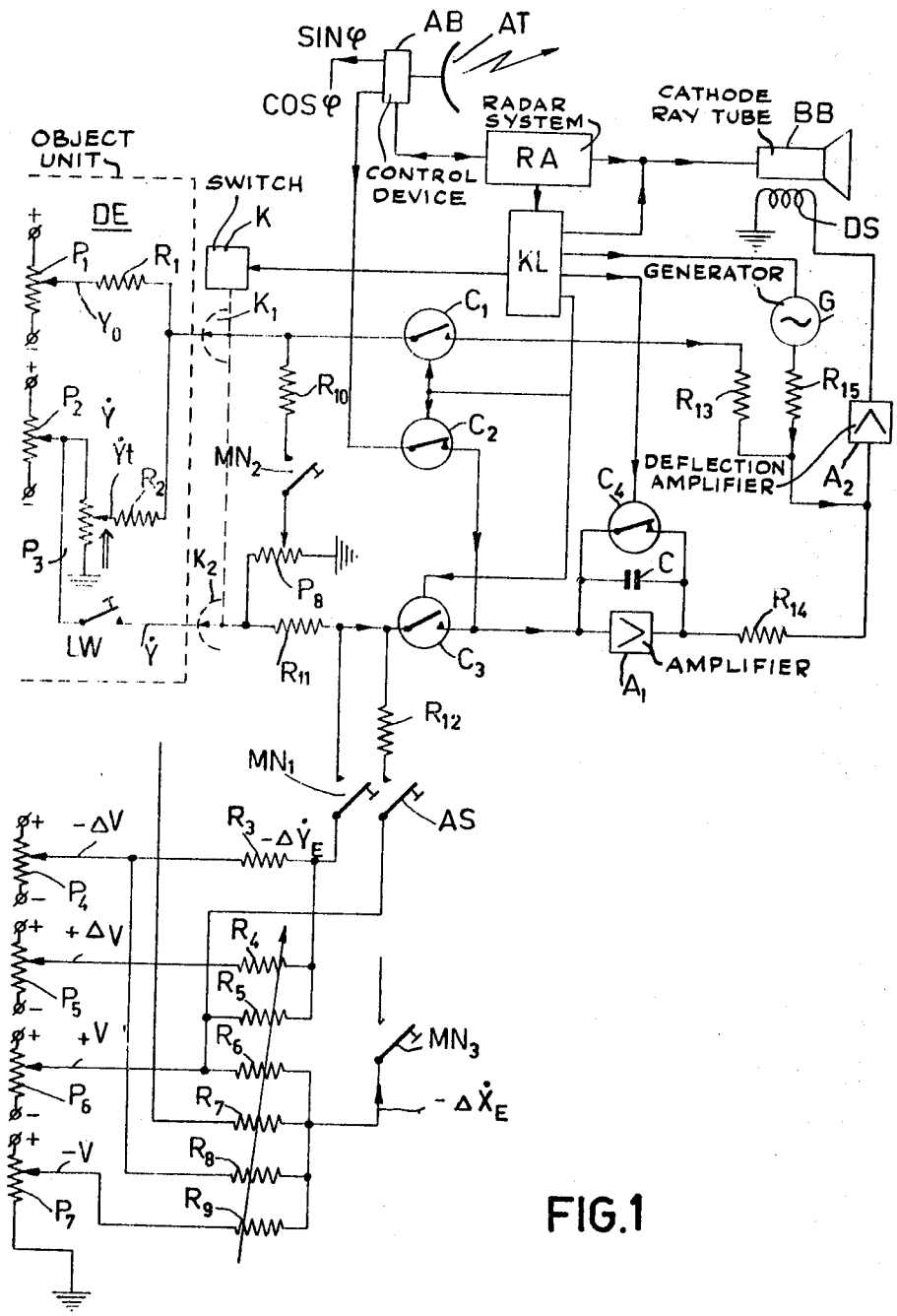

The invention relates to a navigation arrangement and more particularly a vessel navigation arrangement having a radar system including a cathode-ray tube provided with deflection means for the formation of a panoramic image on the screen of the cathode-ray tube.

The practical value of a radar system for ships may be judged by the extent of simplification in making decisions required for safe navigation.

Generally, the auxiliary means used in conjunction with ship's radar indicators have included "true motion," direction stabilization by means of the compass, reflex plotters, rotatable auxiliary lines and the like, however these, have hitherto not been sufficient to prevent a great deal of time consuming calculating and/or drawing in judging a traffic situation at sea. Even greater difficulties arise if it is desirable to know beforehand the consequences of a planned change of course or speed for the situation, particularly if several ships are in the neighbourhood.

It has been found in practice that collisions between ships may occur notwithstanding the presence of a radar system. This is generally due to misinterpretation of the radar image, in that the radar image generally represents only the instantaneous relative positions of their ships and does not represent the relative courses, and it is difficult to assess whether ships will approach each other too closely. With regard to the comparatively poor maneuverability of ships, it must be decided at an early stage whether the course and/or the speed of the ship concerned must be changed in order to prevent collision.

In order to visualize the relative course on a radar screen, the screen would have to exhibit an afterglow time of many minutes, which is not possible in practice.

In a known method of visualizing relative courses, use is made of storage devices in which the radar images of past periods are stored and subsequently superimposed on the instantaneous radar image so that the path covered by the other ships is visualized, as it were, on the screen with respect to the ship concerned. In order to assess any danger of collision, the course lines of the various ships must be considered to be extrapolated so that it is possible to see whether these lines extend too closely along the position of the ship concerned. These known arrangements suffer from a limitation in that it is difficult to assess the situation if the course and/or the speed of the ship concerned are changed, since the radar image, as already stated, represents only the relative course with respect to the ship concerned and does not represent the relative speed or the real courses of the ships with respect to each other.

In practice, the use of so-called "true motion" radar has also disadvantages. A radar system having a cathode-ray tube is commonly supplied with saw-tooth deflection signals to the display tube for the formation of a panoramic image on the screen of the tube under control of received echo signals, while means are available for supplying manually adjustable deflection signals to the display tube at instants at which the saw-tooth deflection signals are inoperative for the formation of place-adjustable marks on the screen. In this arrangement, the deflection signals for the formation of the marks on the screen for each of two directions of co-ordinates at right angles to each other consist of a first deflection signal adjustable through a first potentiometer, on which signal are superimposed the output signal of a first modulator and that of a second modulator, to which modulators is supplied a second signal adjustable through a second potentiometer, these modulators being designed so that their output signals are proportional to time and to the said second signal while the control steepness of the second modulator exceeds by far that of the first modulator, the arrangement being such that a course line is drawn on the screen in accordance with the course of a given object.

This known arrangement suffers from a limitation in that it is not possible to adjust in a simple manner by means of the potentiometers a course line on the screen, but the speed and the direction of the concerned object must first be assessed by separate measuring, whereupon the said potentiometers (which are provided for this purpose with a calibrated scale) are adjusted accordingly. Consequently, the arrangement is not suitable for navigation purposes.

The invention utilizes such a radar system and provides a navigation arrangement with which the course lines of other ships may be adjusted on the screen of a radar system in a simple manner without the use of further auxiliary means, while it is further possible to visualize the shapes of these course lines if the course and/or the speed of the ship concerned would be changed (for example in order to prevent danger of collision).

The navigation arrangement according to the invention is characterized in that the first modulator includes a third potentiometer, the shaft of which is driven at uniform and very low speed through a delay device by a motor, and the output signal of which is derived from the displaceable potentiometer contact, the arrangement being such that by the adjustment of the said first potentiometer for each direction of co-ordinates at a first instant and by the subsequent adjustment of the said second potentiometer for each direction of co-ordinates at a later instant, the mark on the screen may be caused to coincide with the image of the given object.

It is not possible to carry out the adjustment in this manner in the known radar system, since the first modulator is constituted by a saw-tooth generator the control steepness of which is proportional to the input signal so that the output voltage is proportional to the time integral of the input signal and is not, as is the case according to the invention, proportional to the product of two independent factors, that is to say the input signal and time.

Figure 2:
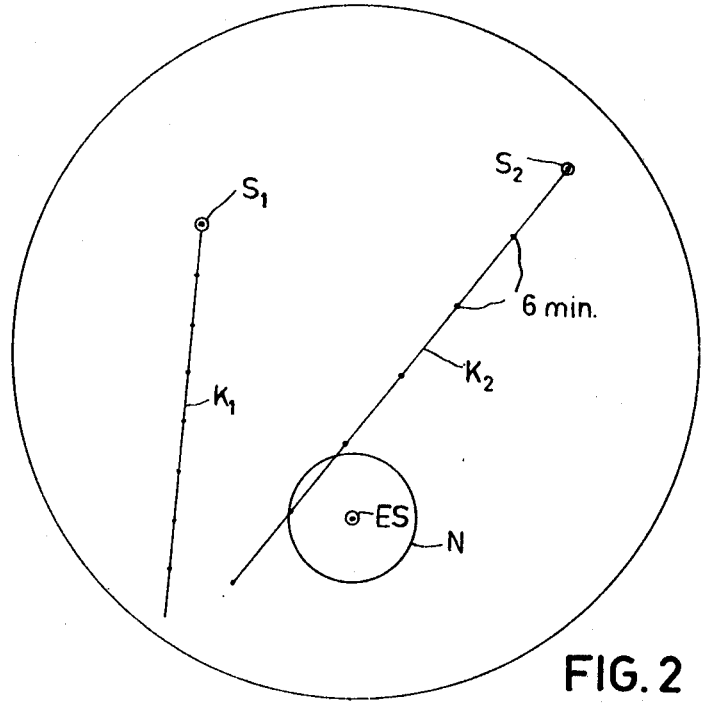
Figure 3:
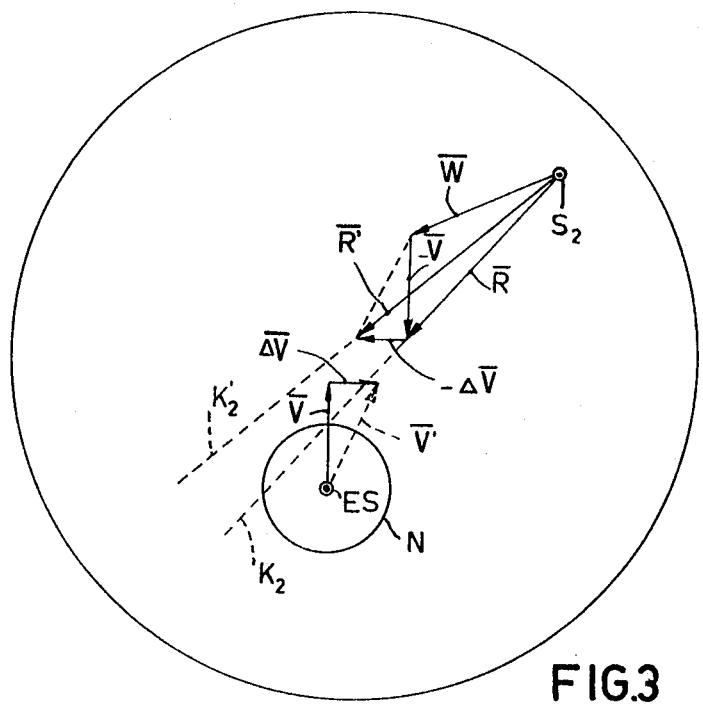
Figure 4:
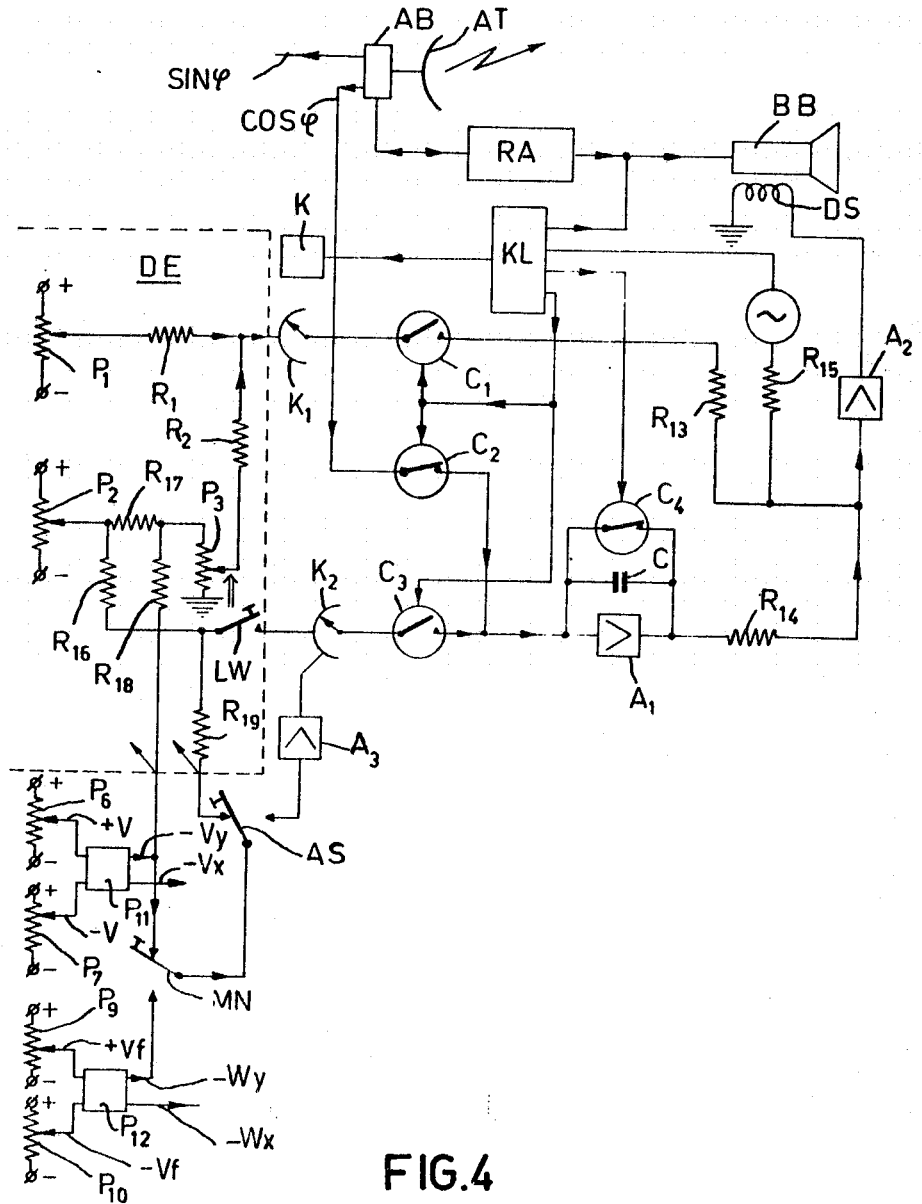

The following is a description of a number of embodiments of the invention, with reference to the accompanying drawings in which; FIG. 1 is in a schematic illustration of the invention; FIGS. 2 and 3 are representative of the data produced by the invention; and FIG. 4 illustrates an alternative or further embodiment of the invention.

The arrangement shown in FIG. 1 comprises a radar system RA which co-operates with the radar transceiver aerial AT which is controlled by the control device AB. The video signals are normally supplied by the radar system RA to a cathode-ray tube BB and control in known manner the intensity of the cathode ray for the formation of a panoramic image on the display screen of the tube. These arrangements are known per se. The circuit arrangement for producing the deflection signals for the cathode-ray tube is shown in the drawing in greater detail for the vertical deflection or Y-direction which is assumed to correspond with the course of the ship on which the arrangement is provided.

The deflection system for the horizontal or X-direction is identical to the aforementioned system but for a few exceptions.

The aerial control device AB gives off two currents which are proportional to the cosine and the sine, respectively, of the instantaneous directional angle $\varphi$ of the aerial AT. The first current cos $\varphi$ is supplied through an electronic contact $C_2$ which is normally closed to the input of an amplifier $A_1$. The signal proportional to sin $\varphi$ serves in a corresponding manner for the deflection in the X-direction. The output of amplifier $A_1$ is fed back to the input through capacitor C.

Such an arrangement constitutes, as is known, an integration circuit arrangement; the output voltage of the amplifier being proportional to the time integral of the input current. Since the directional signal of the aerial may be considered to be practically constant over a short time, the output voltage of the amplifier $A_1$ will consequently increase proportionally with time, that is to say that the slope is proportional to cos $\varphi$. The capacitor C is bridged by the electronic contact $C_4$ which is controlled by a clock pulse generator KL which receives synchronizing pulses from the radar system RA at instants corresponding with the emitted radar pulses. The contact $C_4$ is normally conducting so that the output voltage of the amplifier $A_1$ is constant. When a radar pulse is emitted, the pulse generator KL supplies during the subsequent echo period a pulse to the contact $C_4$, as a result of which this contact is opened. During this period, the output votlage of the amplifier $A_1$ will vary linearly with time, as already described above, until at the end of the echo period the contact $C_4$ is closed again and the capacitor C is discharged again.

The sawtooth output voltage of amplifier $A_1$ is supplied through the resistor $R_{14}$ and the deflection amplifier $A_2$ to the deflection coil DS of the display tube BB. In a corresponding manner, the deflection system of the horizontal deflection (not shown) supplies a saw-tooth voltage to the deflection coil of the horizontal deflection, the slope of this voltage being proportional to sin $\varphi$ so that a radial deflection is obtained the slope of which is at an angle $\varphi$ to the vertical.

The arrangement further comprises a plurality of object units DE, for example six, one of which is shown in the figure, only as far as the control is concerned, which part is otherwise identical to the part of the horizontal control.

The object units are connected with the outputs of a distributor switch K which in this case has the form of a step switch having a plurality of wipers which pass along output contacts $K_1$, $K_2$, but which switch may also be constructed as a relay selector. The switch K receives pulses from the clock pulse generator KL at suitable instants so that the object units are connected in cyclic order of succession with the central part of the switch.

At the same intervals, the pulse generator KL supplies pulses to the electronic contacts $C_1$, $C_2$ and $C_3$, as a result of which the interruption contact $C_2$ is opened while the make contacts $C_1$ and $C_3$ are closed. These pulses have a duration of from a short time after the end of an echo period till the end of the subsequent echo period, while moreover the clock pulse generator KL controls in a suitable manner the brightness of the display tube BB during this period. During such a period, the panoramic image proper is thus interrupted during one scanning movement. If desired, the duration of the pulses of pulse generator KL may also be shorter so that they lie in the dead periods between the end of an echo period and the beginning of the subsequent echo period, in which circumstances the panoramic image need consequently not be interrupted. The pulses supplied to the distributor switch K lie between the pulses at the switching contacts $C_1$, $C_2$ and $C_3$ and preferably appear immediately after the end of the last-mentioned pulses.

The object units DE comprise six potentiometers of which only the potentiometers $P_1$, $P_2$ and $P_3$ for the vertical deflection are shown.

The potentiometers $P_1$ and $P_2$ are manually adjustable while potentiometer $P_3$ is driven via a slip-coupling by a motor (not shown) at a uniform and very low speed so that the potentiometer is transferred from the zero position to the other extreme position in, for example, half an hour.

The circuit arrangement further operates as follows.

When another ship is observed on the panorama screen, one of the object units DE is put in operation.

At the instance at which the object unit is throughconnected via switch K and also the contacts $C_1$ and $C_3$ are closed, the voltage of the potentiometer $P_1$ is supplied through resistor $R_1$, the contacts $K_1$ and $C_1$, resistor $R_{13}$ and the deflection amplifier $A_{12}$ to the deflection coil DS of the display tube BB. During part of the period in which the pulse generator KL supplies pulses to the electronic contacts $C_1$, $C_2$ and $C_3$, that is to say during the period between the end of an echo period and the beginning of the subsequent echo period, the pulse generator also supplies a release pulse to the generator G which supplies two alternating output voltages shifted in phase by 90° with respect to each other, one of these voltages being supplied to the deflection amplifier $A_2$ for the vertical deflection while the other voltage is supplied to the deflection amplifier $A_2$ for the horizontal deflection, as a result of which the light spot draws a small circle on the screen. The potentiometer $P_3$ is now manually adjusted to the zero position so that it does not give off a voltage. Subsequently, the potentiometer $P_1$ and the potentiometer for the horizontal deflection corresponding with it are manually adjusted so that the light spot on the screen coincides with the position of the concerned ship in the radar image. The output voltage of potentiometer $P_1$ is then consequently determinative of the relative vertical initial position Y of the other ship.

The potentiometer $P_3$ is subsequently driven by the motor so that the voltage division ratio slowly increases from zero linearly with time. After a short time, for example 5 minutes, the relative position of the ship has changed so that the light spot on the screen no longer coincides with the position of the other ship. Subsequently, the potentiometer $P_2$ and the potentiometer for the horizontal deflection corresponding with it are manually adjusted so that the light spot is again caused to coincide with the new position of the other ship. The output voltage of potentiometer $P_2$ is supplied to potentiometer $P_3$ the output voltage of which is supplied through resistor $R_2$, the contacts $K_1$ and $C_1$ and resistor $R_{13}$ to the deflection amplifier $A_2$ and is thus superimposed on the deflection voltage produced by the potentiometer $P_1$. The output voltage of potentiometer $P_2$ is then proportional to the relative vertical speed component $\dot{Y}$ of the ships and the output voltage of potentiometer $P_3$ is proportional to the product of this speed component $\dot{Y}$ and time $t$ so that the total deflection voltage is proportional to $Yo+\dot{Y}t$. As long as the courses and the speeds of the ships remain unchanged, the light spot will consequently further follow the position of the other ship.

If the relative course line of the other ship must be visualized, the contact LW is closed. The output voltage $\dot{Y}$ of potentiometer $P_2$ is then supplied through contact LW, contact $K_2$, resistor $R_{11}$ and contact $C_3$ to the input of amplifier $A_1$. As already stated, the contact $C_4$ is periodically opened during each echo period under the control of the pulse generator KL. The amplifier $A_1$ supplies during this period through resistor $R_{14}$ a voltage to the deflection amplifier $A_2$ which is proportional to the input current and increase proportionally to time. During this period, the generator G is blocked again. Consequently, the light spot draws on the screen a straight line which originates from the instantaneous position of the other ship and the slope of which corresponds with the relative course direction. This line consequently corresponds with the path the other ship will cover in future if the courses and speeds of the ships remain unchanged. The speed at which the light spot draws the line of approach is proportional to the relative speed of the ships. When the pulse generator KL superimposes periodical pulses on the constant brightness control of the display tube BB, brightness spots will consequently appear on the line the relative distance of which is proportional to the speed and is consequently a measure for the path covered in a given period of time, for example, in 6 minutes.

In a similar manner, lines of approach of other ships may be drawn under the control of other object units.

If several ships are present, the image on the display tube has a shape, for example, as shown in FIG. 2. In this figure, $S_1$ and $S_2$ represent the positions of two ships having relative course lines $K_1$ and $K_2$ on which the paths covered, for example, in a period of 6 minutes are visualized by means of brightness spots. The position of the ship concerned is designated by ES and the circle N represents the minimum distance allowed between passing ships at which danger of collision is considered to be excluded. It is apparent from FIG. 2 that the ship $S_2$ causes danger of collision after approximately 27 minutes. Consequently, it is desirable to change the course and/or the speed of the ship concerned.

As has already been stated, the image of the lines of approach provides relative course directions and relative speeds. A relative speed vector $\overline{R}$, for example, of the ship $S_2$ in fact consists, as indicated in FIG. 3, of the difference between the absolute speed vector $\overline{W}$ (with respect to stationary objects) of the other ship and the absolute speed factor $\overline{V}$ of the ship concerned. As indicated in FIG. 3, after the course and/or the speed of the ship concerned has been changed, the new relative course directions and the relative speed vectors will likewise be equal to the difference between the absolute speed vectors of the other ship and the new absolute speed vector of the ship concerned. In other words, in order to assess the shapes of the lines of approach after a change of the movement of the ship concerned, the relative speed vector $\overline{R}$ of the other ship must be subtracted from the difference vector $\Delta \overline{V}$ of the old speed vector $\overline{K}$ and the new speed vector $\overline{R}'$ of the ship concerned, which results in the new relative speed vector $\overline{R}'$ of the other ship. The new relative course line is then represented by $K_2'$. The components of the relative speeds in the two directions at right angles to each other are, as has already been stated, proportional to the output voltages of the potentiometer $P_2$ for the Y-direction and of the potentiometer of the X-direction corresponding therewith in the various object units DE.

The arrangement shown in FIG. 1 comprises a circuit arrangement for producing voltages for the two coordinates which are indicative of the planned change of the course.

It may be proved that if the speed and the change of the speed of the ship concerned are chosen to be equal to V and to $\Delta V$, respectively, while the change of the angle of the course direction is equal to $\alpha$ and moreover, as was already assumed, the original course direction of the ship concerned corresponds with the Y-direction or the vertical direction of the radar image, the components of the change of the speed vector of the ship concerned in the X-direction and in the Y-direction, respectively, are equal to:

$$\Delta \dot{X}_E = -(V+\Delta V) \sin \alpha$$

and $$\Delta \dot{Y}_E = \Delta V - 2(V+\Delta V) \sin^2 \frac{\alpha}{2}$$

In order to visualize the new course directions after an assumed change of the movement of the ship concerned, currents proportional to $-\Delta \dot{Y}_E$ and to $-\dot{X}_E$ must be added to the currents produced by the potentiometer $P_2$ and by the potentiometer of the X-direction corresponding therewith.

For this purpose, the circuit arrangement comprises a plurality of potentiometers $P_4$, $P_5$, $P_6$, $P_7$. The potentiometers $P_6$ and $P_7$ are driven by the same shaft provided with a scale calibrated according to speed and are manually adjusted in accordance with the speed of the ship concerned so that they supply an output voltage equal to $+V$ and to $-V$, respectively. The potentiometers $P_4$ and $P_5$ are likewise driven by the same shaft while they may be manually varied so that the output voltages are proportional to $-\Delta V$ and to $+\Delta V$, respectively. The outputs of the potentiometers are connected with a plurality of resistors $R_3$–$R_9$. The resistors $R_3$, $R_4$ and $R_5$ serve to produce a current proportional to $-\Delta \dot{Y}_e$ while the resistors $R_6$, $R_7$, $R_8$ and $R_9$ serve to produce a current proportional to $-\Delta \dot{X}_e$. The resistor $R_3$ has a fixed value. When the new course lines must be visualized, the contact $MN_1$ is closed. A current proportional to $-\Delta V$ is then supplied through resistor $R_3$ and the contacts $MN_1$ and $C_3$ to the amplifier $A_1$ and is thus superimposed on the current supplied by the potentiometer $P_2$ through contact $K_2$, resistor $R_{11}$ and contact $C_3$, which current is proportional to $\dot{Y}$.

The values of resistors $R_4$–$R_9$ may be varied by means of a common switch (not shown) in accordance with different values of an assumed change of course, for example, in steps of 10°. The resistor $R_4$ then assumes in the different positions of the switch such values that its output current is proportional to $$+2\Delta V \sin^2 \frac{\alpha}{2}$$

The output current of the resistor $R_5$ is likewise proportional to $$+2V \sin^2 \frac{\alpha}{2}$$

In a similar manner, curents are produced through resistors $R_5$–$R_9$ for the formation of a total output current proportional to $$-\Delta \dot{X}_E = -(V+\Delta V) \sin \alpha$$

which is supplied in a corresponding manner to the deflection system of the horizontal deflection.

More particularly, the resistor $R_6$ supplies a current proportional to $-\Delta C \sin \alpha$ for negative values of $\alpha$ (in which case sin α is consequently negative) while the resistor $R_9$ supplies a current proportional to $-\Delta V \sin \alpha$ for positive values of α.

The resistors $R_7$ and $R_8$ likewise supply a current proportional to $-\Delta V \sin \alpha$ for negative and positive values of α, respectivaly.

By varying the magnitudes $-\Delta \dot{X}_E$ and $-\Delta \dot{Y}_E$, it is possible to appreciate within a very short time with the aid of the new course lines what maneuver can be best performed to prevent a collision.

In general, the performance of a maneuver requires a certain amount of time. Consequently, it is of importance to know the shapes of the lines of approach if the maneuver is not performed immediately, but only after a few minutes. In order to take this delay time also into account, a current proportional to the relative speed component Y is superimposed on the deflection current through the contact $MN_2$ which is operated together with the contact $MN_1$ and through the resistor $R_{10}$, while the proportionality factor which is proportional to the manuever delay time may be adjusted by means of potentiometer $P_8$ which is connected on the one hand with the circuit element $K_2$ to which a voltage is supplied which is proportional to the relative speed component Y. In the same manner, a current is superimposed on the deflection current of the horizontal deflection. As a result of this measure, the initial points of the lines of approach on the screen are displaced to image points corresponding with places the ships will reach only after some time.

With regard to the regulations of the International Convention for ships to stand out at sea, it is further of importance to know at what angle the ship concerned is sounded by other ships. When the manually operable contact AS is closed, a current proportional to the speed of the ship concerned is superimposed on the current supplied to the amplifier $A_1$ which is proportional to the relative speed component Y so that the total current is proportional to the absolute speed component of a meeting ship. As a result, an image of course lines is produced on the screen which corresponds with the real course directions of the various ships, that is to say as if the ship concerned were at a standstill. It is thus easy to assess whether the position of the ship concerned is on the lefthand side or on the righthand side of this real course line. In the embodiemnt shown in FIG. 4, it is assumed that the vertical direction of the radar image on the screen of the display tube BB invariably corresponds with a fixed direction on earth, for example, the north-south direction. Such a radar system is known per se and will not further be described herein.

The arrangement shown in FIG. 4 partly corresponds with that of FIG. 1 and corresponding elements are designated by the same references.

The object units DE of which one is shown in the figure, and again only as far as the part of the vertical deflection is concerned, are connected just as in FIG. 1 to outputs of the selector K provided with contact brushes $K_1$ and $K_2$.

The object unit DE comprises, just as in FIG. 1, for the vertical deflection two manually adjustable potentiometers $P_1$ and $P_2$, a potentiometer $P_3$ driven by a motor at low speed the output voltage of which increases linearly with time and a switch LW for visualizing course lines.

The output voltages of the potentiometers $P_1$ and $P_2$ are supplied through the resistor $R_1$ and the resistor $R_{17}$, respectively, the potentiometer $P_3$ and the resistor $R_2$ and further in common through the contact $K_1$ of the selector K, the electronic contact $C_1$, the resistor $R_{13}$, the deflection amplifier $A_2$ to the deflection coil DS for the vertical deflection of the display tube BB. The potentiometers $P_1$ and $P_2$ are again adjusted at different instants so that the light spot on the screen is caused to coincide with the image of another ship, while during the adjustment of the potentiometer $P_1$ also the potentiometer $P_3$ is adjusted to zero. As will appear hereinafter, however, in this case the output voltage of potentiometer $P_2$ is not proportional to the relative speed component in the Y-direction but proportional to the absolute speed component of the other ship.

For this purpose, the arrangement comprises two potentiometers $P_6$ and $P_7$ which are driven by the same shaft and which are manually or automatically adjusted according to the speed V of the ship concerned so that they supply an output voltage which is proportional to $+V$ and $-V$, respectively. These voltages are supplied to sine-cosine potentiometer $P_{11}$ which is designed in known manner so that two output voltages are supplied which are proportional to $-V \sin \beta$ and to $-V \cos \beta$, in which β represents the position of the shaft. The angle β is adjusted so that it corresponds with the course direction of the ship concerned with respect to the North. The output voltages of the potentiometer $P_{11}$ are then consequently proportional to the speed components $-V_X$ and $-V_Y$ of the ship concerned. The voltage proportional to $-V_Y$ is supplied through resistor $R_{18}$ to the potentiometer $P_3$ and is superimposed thereon the output voltage of the potentiometer $P_2$. Since, just as in the arrangement shown in FIG. 1, after the adjustment of the potentiometer $P_2$ the light spot on the screen continues to follow the image of the other ship so that the output voltage of the potentiometer $P_3$ is proportional to the relative speed components of the two ships, the output voltage is thus proportional to the absolute or true speed component Y of the other ship.

The output voltage of the potentiometer $P_{11}$ which is proportional to the speed component $-V_X$ of the ship concerned is also supplied through the break contacts of the manually operable switches MN and AS and the resistor $R_{19}$ to the switch LW to which is supplied on the other hand through ressitor $R_{16}$ the output voltage of the potentiometer $P_2$ so that the signal at the contact LW is also proportional to the relative speed components of the ships.

The contact LW supplies this signal through the contacts $K_2$ and $C_3$ to the amplifier $A_1$ which supplies a saw-tooth voltage which is proportional to this signal and which is supplied through resistor $R_{14}$ and the amplifier $A_2$ to the deflection coil DS so that, just as in FIG. 1, a course line is drawn on the screen of the display tube BB.

In order to assess the shapes of the course lines in case of a change of the course and/or of the speed of the ship concerned, the arrangement comprises two manually adjustable potentiometers $P_9$ and $P_{10}$ having a common shaft and a sine-cosine potentiometer $P_{12}$, which potentiometers co-operate in the same manner as the potentiometers $P_6$, $P_7$ and $P_{11}$. The potentiometers $P_9$ and $P_{10}$ may be adjusted according to an assumed new speed while the potentiometer $P_{12}$ may be adjusted according to an assumed new course direction so that output voltages $-W_X$ and $-W_Y$ are obtained which are proportional to the two speed components of an assumed new course of the ship. By commutation of the change-over contact MN, the voltage $-W_Y$ is supplied through the contacts MN and AS and resistor $R_{19}$ to the contact LW instead of the voltage $-V_Y$ which corresponds to the real course direction of the ship so that the slopes of the course lines now drawn will correspond with the assumed new movement of the ship. However, the voltage $-V_Y$ is still supplied through resistor $R_{18}$ to the potentiometer $P_3$ so that the initial points of the course lines drawn on the screen continue to coincide with the image points of the corresponding ships.

When the change-over contact AS is operated, the current through resistor $R_{19}$ is interrupted so that a signal component which is only proportional to the output voltage of potentiometer $P_2$ (i.e. proportional to the absolute speed component of the other ship) is supplied through the contacts LW, $K_2$ and $C_3$ to the amplifier $A_1$ so that the directions of the course lines drawn on the screen now correspond to the real course directions of the various ships with respect to stationary objects. Moreover, the output voltage $-V_Y$ of potentiometer $P_{11}$ which is proportional to the Y-component of the movement of the ship concerned is supplied through contact MN and make contact AS to the input of the invertor amplifier $A_3$. The output of the invertor amplifier $A_3$ is connected with an output of the selector switch K to which no object unit DE is connected.

During the instants at which the selector K is adjusted to this output, a line will consequently be drawn on the screen of the display tube which corresponds to the real course of the ship concerned.

If the contacts MN and AS are operated simultaneously, this course line corresponds to the assumed new course direction of the ship concerned.

What is claimed is:

1. A navigational radar ararngement comprising means for transmitting and receiving radar echo pulses, a cathode ray display tube, first deflection means for producing a first deflection potential coupled to said cathode ray tube and responsive to the reception of said echo pulses for displaying marking pulses on said tube coersponding to coordinate information represented by the said echo pulses, second deflection means for producing a second deflection potential and coupled to said cathode ray display tube for displaying marking pulses corresponding to a simulated coordinate image, said second deflection means comprising first means for providing a signal corresponding to a deflection potential for an initial coordinate position of one of said marking pulses displayed on said tube, second means for providing a signal corresponding to a deflection potential for the coordinate position of a subsequently displayed marking pulse, and third means for combining the signals of said first and second means to form said second deflection potential, said third means including means for varying the said second deflection potential from a minimum level to a maximum level over a constant time period, the time rate of change of said second deflection potential thereby being proportional to the time rate of change of said first deflection potential from said initial coordinate position.

2. A navigational radar arrangement comprising means for transmitting and receiving radar echo pulses, a cathode ray tube, first deflection means producing a first deflection potential coupled to said cathode ray tube and operative during the receipt of said echo pulses for displaying marker pulses on said tube corresponding to coordinate information represented by the said echo pulses, and second deflection means for producing a second deflection potential and coupled to said cathode ray display tube for displaying marking pulses corresponding to a simulated coordinate image, said second deflection means comprising a first settable potentiometer for providing an initial deflection potential corresponding to the coordinate position of the initial marking pulse displayed on said tube, a second settable potentiometer coupled to said first settable potentiometer for providing a modified deflection potential corresponding to the coordinate position of a subsequently displayed marking pulse, a third potentiometer connected to the output of said second potentiometer, and means connected to said third potentiometer for varying the resistance thereof from zero to full scale at a linear rate for a predetermined period of time, the time rate of change of said second deflection potential thereby being proportional to the time rate of change of said first deflection potential.

3. The combination of claim 2 further including gating means responsive to said echo pulses for disenabling said second deflection means during the echo pulse period, and enabling said second deflection means during the interval between said echo pulses.

4. A navigational radar arrangement for determining the position of objects having movement relative to the radar carrying craft, comprising means for transmitting and receiving radar echo pulses, a cathode ray display tube, first deflection means producing a first deflection potential coupled to said cathode ray tube and operative during the receipt of said echo pulses for displaying marker pulses on said tube corresponding to coordinate information represented by the said echo pulses, second deflection means for producing a second deflection potential and coupled to said cathode ray display tube for displaying marking pulses corresponding to a simulated coordinate image representing the movement of each of said objects, gating means responsive to said echo pulses for disenabling said second deflection means during the echo pulse period and enabling said second deflection means during the interval between said echo pulses, said second deflection means comprising a plurality of deflection units, each producing a simulated deflection potential representative of a respective one of said objects, commutator switching means for sequentially and continuously switching each respective deflection unit into and out of operative relationship with the cathode ray tube, each deflection unit comprising a first settable potentiometer for providing an initial deflection potential corresponding to the coordinate position of the initial marking pulse displayed on said tube, a second settable potentiometer coupled to said first settable potentiometer for providing a modified deflection potential corresponding to the coordinate position of a subsequently displayed marking pulse, said modified deflection potential having an amplitude proportional to the time rate of change of the position of a respective one of said objects, a third potentiometer connected to the output of said second potentiometer, and means connected to said third potentiomeer for varying the resistance thereof from zero to full scale at a linear rate for a predetermined period of time, the time rate of change of said second deflection potential thereby being proportional to the time rate of change of said first deflection potential, an integrator, said integrator being coupled to said cathode ray display tube, and switching means connecting the output of said second potentiometer to said integrator, the resulting signal being thereby operative to trace a line on said tube which is representative of the predicted course of said object.

5. A navigation arrangement as claimed in claim 4 further including switching means for varying the potential applied to the second potentiometer in accordance with an assumed change of the course and/or of the speed.

6. A navigation arrangement as claimed in claim 5, wherein the vertical direction on the display tube corresponds with the course direction of the radar carrying craft concerned, and wherein a deflection signal is superimposed on the signal supplied to the output of the second potentiometer, which deflection signal for vertical deflection is proportional to $$\Delta V - 2(V + \Delta V) \sin^2 \frac{\alpha}{2}$$

while for horizontal deflection it is proportional to $(V+\Delta V) \sin \alpha$, wherein V represents the proper speed, $\Delta V$ an assumed increase in speed and $\alpha$ an assumed change of the angle of the course.

7. A navigation arrangement as claimed in claim 5, wherein the vertical direction on the display tube corresponds to a fixed direction in space, and wherein the signal supplied to the output of the second potentiometer is formed by means for superimposing a first signal, adjustable in accordance with the speed component of the object in the concerned direction, on a second signal, proportional to the speed component of the proper speed in the concerned direction with opposite polarity, or proportional to the speed component of an assumed changed proper course with opposite polarity.

(References on following page)

References Cited

UNITED STATES PATENTS

| | | | |
|---|---|---|---|
| 2,701,352 | 2/1955 | Kingdon | 343—5 |
| 3,076,120 | 1/1963 | Matthews | 343—5 |
| 3,090,043 | 5/1963 | Wilkenson | 343—5 |
| 3,128,460 | 4/1964 | Moller | 343—5 |
| 3,188,631 | 6/1965 | Birtley | 343—5 |
| 3,212,086 | 10/1965 | Robinson | 343—5 |
| 3,265,869 | 8/1966 | Gray | 343—112.4 X |

RODNEY D. BENNETT, *Primary Examiner.*

C. L. WHITHAM, *Assistant Examiner.*